United States Patent
Zhou et al.

(10) Patent No.: US 9,197,357 B2
(45) Date of Patent: Nov. 24, 2015

(54) METHOD, APPARATUS, AND SYSTEM FOR PROCESSING OPTICAL NETWORK SIGNAL

(71) Applicant: Huawei Technologies Co., Ltd., Shenzhen (CN)

(72) Inventors: Lei Zhou, Shenzhen (CN); Guikai Peng, Shenzhen (CN); Meng Sui, Shenzhen (CN); Zhenping Wang, Shenzhen (CN); Ning Cheng, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/453,351

(22) Filed: Aug. 6, 2014

(65) Prior Publication Data
US 2014/0348507 A1    Nov. 27, 2014

Related U.S. Application Data

(63) Continuation of application No. PCT/CN2012/073426, filed on Mar. 31, 2012.

(51) Int. Cl.
*H04B 10/00* (2013.01)
*H04J 14/06* (2006.01)
(Continued)

(52) U.S. Cl.
CPC ............ *H04J 14/06* (2013.01); *H04B 10/2587* (2013.01); *H04B 10/27* (2013.01); *H04B 10/272* (2013.01); *H04B 10/532* (2013.01); *H04B 10/60* (2013.01)

(58) Field of Classification Search
None
See application file for complete search history.

(56) References Cited

U.S. PATENT DOCUMENTS

| 4,658,394 A | 4/1987 | Cheng et al. |
| 6,421,392 B1 | 7/2002 | King |

(Continued)

FOREIGN PATENT DOCUMENTS

| CN | 102143407 A | 8/2011 |
| CN | 102237977 A | 11/2011 |

(Continued)

OTHER PUBLICATIONS

Duthie, P.J., et al., "Bidirectional Fibre-Optic Link Using Reflective Modulation," XP-001172964, Electronic Letter, vol. 22, No. 10, May 8, 1986, 2 pages.

Abdul-Rashid, H. A., et al., "Subcarrier Multiple Access System using a single optical source to suppress Optical Best Interference," Proceedings of the 2007 IEEE International Conference on Telecommunications and Malaysia International Conference on Communications, May 14-17, 2007 Penang, Malaysia, 3 pages.

(Continued)

*Primary Examiner* — Daniel Dobson
(74) *Attorney, Agent, or Firm* — Slater & Matsil, L.L.P.

(57) ABSTRACT

Embodiments of the present invention provide a method, an apparatus, and a system for processing an optical network signal. The method includes: receiving an optical signal sent by an optical line terminal, where the optical signal includes two polarization components perpendicular to each other, and downlink data is modulated on one of the polarization components; dividing the optical signal into two signals, where each signal is the optical signal; demodulating the downlink data from one optical signal and performing, for the other optical signal, vertical polarization rotation processing and processing of modulating uplink data onto two polarization components of the optical signal; sending the other optical signal on which the vertical polarization rotation processing and the uplink data modulation processing are performed to the optical line terminal. With the embodiments of the present invention, signal processing load of the optical network unit and the optical line terminal can be lowered.

18 Claims, 11 Drawing Sheets

(51) Int. Cl.
*H04B 10/2587* (2013.01)
*H04B 10/272* (2013.01)
*H04B 10/27* (2013.01)
*H04B 10/532* (2013.01)
*H04B 10/60* (2013.01)

(56) References Cited

U.S. PATENT DOCUMENTS

2008/0267635 A1* 10/2008 Kawamoto et al. ... H04L 9/0858
 398/141
2011/0182545 A1 7/2011 Ishikawa et al.

FOREIGN PATENT DOCUMENTS

| CN | 102395059 A | 3/2012 |
| WO | 0243283 A1 | 5/2002 |
| WO | 2011127959 A1 | 10/2011 |

OTHER PUBLICATIONS

Cho, K. Y., et al., "Long-Reach Coherent WDM PON Employing Self-Polarization-Stabilization Technique," Journal of Lightwave Technology, vol. 29, No. 4. Feb. 15, 2011, pp. 456-462.
Jang, S., et al., "A bidirectional RSOA based WDM-PON utilizing a SCM signal for down-link and a baseband signal for up-link," Optical Fiber Communication and the National Fiber Optic Engineers Conference, Mar. 25-29, 2007, pp. 1-3.
Mora, J., et al., "Bidirectional optical access netwok based on PolMUX tecnique using centralized light sources," Microwave Photonics, International Topical Meeting, Oct. 14-16, 2009, pp. 1-4.
Narikawa, S., et al., "Coherent WDM-PON using heterodyne detection with transmitter-side poliarization diversity," IEICE Electronics Express, vol. 7, No. 16, Aug. 25, 2010, pp. 1195-1200.
Woodward, S. L., et al., "Reduction of Optical-Beat Interference in Subcarrier Networks," IEEE Photonics Technology Letters, vol. 8, No. 5, May 1996, pp. 694-696.

* cited by examiner

METHOD, APPARATUS, AND SYSTEM FOR PROCESSING OPTICAL NETWORK SIGNAL

This application is a continuation of International Application No. PCT/CN2012/073426, filed on Mar. 31, 2012, which is hereby incorporated herein by reference in its entirety.

TECHNICAL FIELD

Embodiments of the present invention relate to communications technologies, and in particular, to a method, an apparatus, and a system for processing an optical network signal.

BACKGROUND

A passive optical network (PON) is a mainstream technology in the broadband access field at present. The PON includes an optical line terminal (OLT) installed on a central control station and multiple optical network units (ONU) installed on a user site.

In the prior art, the PON can transmit uplink data and downlink data separately by using two polarizations of an optical signal which are perpendicular to each other. Specifically, the downlink data is modulated on a horizontal component of an optical signal sent by the OLT to the ONU, and a vertical component is used for uplink data modulation. After receiving the optical signal, the ONU needs to divide the optical signal into the vertical component and the horizontal component, and perform demodulation processing for the optical signal on the horizontal component to acquire the downlink data sent by the OLT. In addition, the ONU needs to modulate uplink data to be sent to the OLT onto the vertical component and send the optical signal to the OLT.

However, a direction of the optical signal deflects randomly in a process of transmitting an optical signal from the OLT to the ONU, and a polarization beam splitter (PBS) in the ONU only identifies a polarization in a vertical direction and a polarization in a horizontal direction. Therefore, the PBS cannot identify two polarizations of the optical signal after a random deflection and further cannot perform subsequent downlink data demodulation and uplink data modulation. If the optical signal deflects by 90 degrees in the transmission process, the PBS in the ONU will sends a component, in the optical signal, on which the downlink data is modulated incorrectly to a modulator for uplink data modulation, thereby causing an uplink data modulation error. In addition, the PBS also sends a component, in the optical signal, which is used for uplink data modulation incorrectly to a demodulator for downlink data demodulation, so that the downlink data cannot be demodulated.

SUMMARY

Embodiments of the present invention provide a method, an apparatus, and a system for processing an optical network signal.

An embodiment of the present invention provides a method for processing an optical network signal, including receiving an optical signal sent by an optical line terminal, where the optical signal includes two polarization components perpendicular to each other, and downlink data is modulated on one of the polarization components, dividing the optical signal into two signals, where each signal is the optical signal, demodulating the downlink data from one optical signal, and performing, for the other optical signal, vertical polarization rotation processing and processing of modulating uplink data onto two polarization components of the optical signal, and sending the other optical signal on which the vertical polarization rotation processing and the uplink data modulation processing are performed to the optical line terminal, so that the optical line terminal demodulates the uplink data from the received optical signal.

An embodiment of the present invention provides another method for processing an optical network signal, including receiving an optical signal sent by an optical network unit, outputting one polarization component correspondingly from a first polarization port and outputting another polarization component correspondingly from a second polarization port, where the first polarization port is configured to, when downlink data is being sent to the optical network unit, input a polarization component on which the downlink data is modulated, and the second polarization port is configured to, when the downlink data is being sent to the optical network unit, input a polarization component on which no downlink data is modulated, and demodulating uplink data from the polarization component output from the first polarization port and isolating the polarization component output from the second polarization port.

An embodiment of the present invention provides an optical network unit, including an optical signal transceiver, a downlink data processing module, and an uplink data processing module, where the optical signal transceiver is configured to receive an optical signal sent by an optical line terminal, where the optical signal includes two polarization components perpendicular to each other, and downlink data is modulated on one of the polarization components; divide the optical signal into two signals, where each signal is the optical signal; and send one signal to the downlink data processing module, send the other optical signal to the uplink data processing module, and send an optical signal sent by the uplink data processing module to the optical line terminal, the downlink data processing module is configured to demodulate the downlink data from the received optical signal, and the uplink data processing module is configured to perform, for the received optical signal, vertical polarization rotation processing and processing of modulating uplink data modulation onto two polarization components of the received optical signal, and send the optical signal on which the vertical polarization rotation processing and the uplink data modulation processing are performed to the optical signal transceiver, so that the optical signal transceiver sends the optical signal to the optical line terminal.

An embodiment of the present invention provides an optical line terminal, including: a polarization beam combiner, an uplink data processing module, and an optical isolator, where the polarization beam combiner is configured to receive an optical signal sent by an optical network unit, output one polarization component correspondingly from a first polarization port, and output another polarization component correspondingly from a second polarization port, where the first polarization port is configured to, when downlink data is being sent to the optical network unit, input a polarization component on which the downlink data is modulated, and the second polarization port is configured to, when the downlink data is being sent to the optical network unit, input a polarization component on which no downlink data is modulated, the uplink data processing module is configured to demodulate an uplink data from the polarization component output from the first polarization port, and the optical isolator is configured to isolate the polarization component output from the second polarization port.

An embodiment of the present invention provides an optical network communications system, including an optical line terminal and an optical network unit, where the optical line terminal is connected to the optical network unit by using an optical splitter, and the foregoing optical line terminal is used as the optical line terminal, and the foregoing optical network unit is used as the optical network unit.

An embodiment of the present invention provides another optical network communications system, including an optical line terminal and an optical network unit, where the optical line terminal is connected to the optical network unit by using an arrayed waveguide grating, and the foregoing optical line terminal is used as the optical line terminal, and the foregoing optical network unit is used as the optical network unit.

In the embodiments of the present invention, there is no need for an optical network unit to use a complex method to perform polarization correction on a received optical signal, and there is also no need to distinguish specific polarizations. Based on this, on one hand, the optical network unit in the embodiments of the present invention can demodulate downlink data directly from an optical signal sent by an optical line terminal, and on the other hand, for uplink data, the optical network unit can perform vertical polarization rotation processing on an optical signal and uplink data modulation processing on two polarization components, and send the processed optical signal to the optical line terminal. With the use of a minor symmetry characteristic between uplink and downlink on an optical network, two polarization components of an optical signal received by the optical line terminal are perpendicular correspondingly to two polarization components of an optical signal previously sent by the optical line terminal. Therefore, without the need to perform complex polarization correction, the optical line terminal can conveniently demodulate the uplink data from a correct polarization component. After receiving an optical signal sent by the optical network unit, the optical line terminal can demodulate uplink data from an optical signal output from a first polarization port of a polarization beam combiner by using a characteristic of the polarization beam combiner in the optical line terminal, and isolate an optical signal output from a second polarization port of the polarization beam combiner. Therefore, without the need to perform complex polarization correction on the received optical signal, the optical line terminal can conveniently demodulate the uplink data, thereby reducing signal processing complexity and hardware costs.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
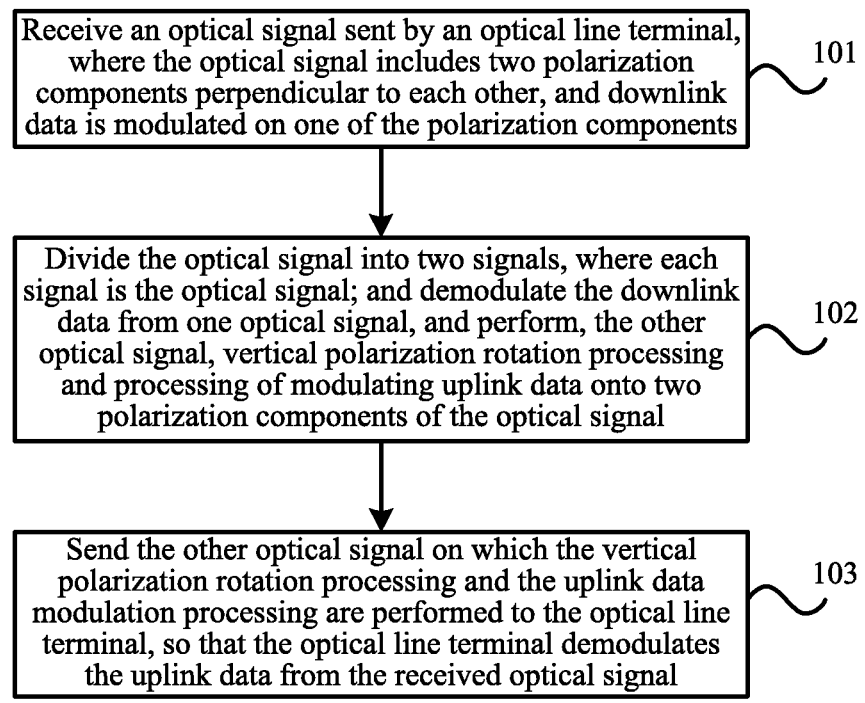
FIG. 1 is a flowchart of a first embodiment of a method for processing an optical network signal according to the present invention.

FIG. 1 is a flowchart of a first embodiment of a method for processing an optical network signal according to the present invention. As shown in FIG. 1, the method in this embodiment may include:

Step 101: Receive an optical signal sent by an optical line terminal, where the optical signal includes two polarization components perpendicular to each other, and downlink data is modulated on one of the polarization components.

Specifically, an ONU may receive an optical signal sent by an OLT, where the optical signal may include two polarization components perpendicular to each other. It is understandable that the optical signal deflects randomly in a downlink transmission process, and although the two polarization components of the optical signal received by the ONU are perpendicular to each other, there is an included angle between directions of the two polarization components of the optical signal received by the ONU and directions of two corresponding polarization components of an optical signal sent by the OLT. The angle is denoted as δ in this embodiment, and a value of δ depends on a link characteristic.

For ease of description, the two polarization components in this embodiment are respectively denoted as a first polarization component and a second polarization component. In addition, that the OLT modulates downlink data on the first polarization component of the optical signal is used as an example for description in this embodiment. It should be noted that adopting a manner of "first" and "second" for description does not indicate that the ONU needs to distinguish which polarization component is the first polarization component and which polarization component is the second polarization component.

Specifically, the first polarization component may be a horizontal component of the optical signal, and the second polarization component may be a vertical component of the optical signal; or the second polarization component is a horizontal component of the optical signal, and the first polarization component is a vertical component of the optical signal.

Step 102: Divide the optical signal into two signals, where each signal is the optical signal; and demodulate the downlink data from one optical signal, and perform, for the other optical signal, vertical polarization rotation processing and processing of modulating uplink data onto two polarization components of the optical signal.

Specifically, the two polarizations of the optical signal deflect randomly in the downlink transmission process of the optical signal from the OLT to the ONU, resulting that the directions of the two polarization components of the optical signal received by the ONU may be unidentifiable. Therefore, in the prior art, after receiving an optical signal, the ONU must use a complex polarization correction method, so that, in two polarization components of the optical signal, a PBS can correctly send a polarization signal on which downlink data is modulated to a demodulator, and correctly send a polarization signal used for uplink data modulation to a modulator.

By contrast, in this embodiment, after receiving an optical signal, the ONU does not need to perform polarization correction on the optical signal and does not need to distinguish between two polarization components of the optical signal.

Specifically, after the ONU receives the optical signal, on one hand, in a situation that the ONU does not perform polarization correction and does not need to distinguish between the two polarization components of the optical signal, the ONU may directly send the optical signal to the demodulator, so that the demodulator can demodulate downlink data from the optical signal.

On the other hand, the ONU may perform, for the received optical signal, vertical polarization rotation processing and processing of modulating uplink data onto the two polarization components of the optical signal. Specifically, a processing procedure may be implemented in the following two manners.

Manner 1: 45-degree rotation—uplink data modulation—reflection—45-degree rotation.

The ONU may first rotate the two polarization components by 45 degrees, modulate uplink data onto the two polarization components which have been rotated by 45 degrees, perform reflection processing on the two polarization components after the uplink data is modulated, and continue to rotate by 45 degrees the two polarization components on which the reflection processing is performed.

Specifically, before the vertical rotation processing, the first polarization component and the second polarization component are perpendicular to each other. Therefore, after the first 45-degree rotation processing, the first polarization component and the second polarization component are still perpendicular to each other, but both the first polarization component and the second polarization component are rotated by 45 degrees.

After the uplink data is modulated onto the two polarization components, because the downlink data has been modulated onto the first polarization component on which the 45-degree rotation processing is performed, and then the uplink data is further modulated onto the first polarization component, the uplink data and the downlink data are modulated onto the first polarization component after the uplink data modulation processing. Modulation of the uplink data and the downlink data at the same time results that the modulated data becomes invalid, and only the uplink data is modulated on the second polarization component on which the 45-degree rotation processing is performed.

Then, the reflection processing is performed on the two polarization components after the uplink data is modulated, so that the two polarization components can return along an original path.

Then, the second 45-degree rotation is performed on the two polarization components which have returned along the original path. In this case, the first polarization component has completed a 90-degree rotation, and the second polarization component has also completed a 90-degree rotation.

Manner 2: uplink data modulation—45-degree rotation—reflection—45-degree rotation.

After receiving the optical signal sent by the OLT, the ONU may first modulate the uplink data onto the two polarization components, then rotate by 45 degrees the two polarization components after the uplink data is modulated, perform reflection processing on the two polarization components which have been rotated by 45 degrees, and continue to rotate by 45 degrees the two polarization components on which the reflection processing is performed.

Manner 2 is similar to manner 1 in terms of implementation process, implementation principle, and implementation result. Therefore, details are not described herein again.

Therefore, compared with the optical signal received by the ONU, the foregoing processed optical signal is rotated by 90 degrees in the two polarization components. That is, the first polarization component of the optical signal received by the ONU and the foregoing processed first polarization component are perpendicular to each other, and the second polarization component of the optical signal received by the ONU and the foregoing processed second polarization component are perpendicular to each other. Therefore, for a comparison between the foregoing processed optical signal and the optical signal sent by the OLT, a relative deflection angle between the foregoing processed first polarization component and the first polarization component of the optical signal sent by the OLT is δ+90 degrees, and a relative deflection angle between the foregoing processed second polarization component and the second polarization component of the optical signal sent by the OLT is δ+90 degrees.

Preferably, subcarrier multiplexing (Subcarrier Multiplexing, hereinafter referred to as SCM), orthogonal frequency division multiplexing (Orthogonal Frequency Division Multiplexing, hereinafter referred to as OFDM), quadrature phase shift keying (Quadrature Phase Shift Keying, hereinafter referred to as QPSK), or M-quadrature amplitude modulation (M-Quadrature Amplitude Modulation, hereinafter referred to as M-QAM) may be used in the uplink data modulation processing described in the foregoing process so as to modulate the uplink data onto a corresponding subcarrier in the optical signal. Therefore, for multiple ONUs on a PON, with the use of the foregoing modulation manner, bandwidth used by the uplink data can be scheduled between the ONUs at a subcarrier level.

Step 103: Send the other optical signal on which the vertical polarization rotation processing and the uplink data modulation processing are performed to the optical line terminal, so that the optical line terminal demodulates the uplink data from the received optical signal.

After the processing in step 102 is completed, the ONU may send the optical signal on which the vertical rotation processing and the uplink data modulation processing are performed to the OLT.

On an optical network, such as a PON and a wavelength division multiplexing passive optical network (WDM-PON), there is a mirror symmetry characteristic between the uplink and the downlink. Therefore, the mirror symmetry characteristic between the uplink and the downlink can be used in this embodiment.

Specifically, for the optical signal sent by the ONU to the OLT, a relative deflection angle between the first polarization component and the first polarization component of the optical signal sent by the OLT to the ONU is δ+90 degrees, and a relative deflection angle between the second polarization component and the second polarization component of the optical signal sent by the OLT to the ONU is δ+90 degrees. Therefore, after the optical signal sent by the ONU to the OLT is transmitted through the uplink, the first polarization component reversely deflects by δ degrees, and the second polarization component also reversely deflects by δ degrees. Therefore, compared with the first polarization component of the optical signal previously sent by the OLT to the ONU, the first polarization component of the optical signal received by the OLT is rotated by 90 degrees, and compared with the second polarization component of the optical signal previously sent by the OLT to the ONU, the second polarization component of the optical signal received by the OLT is rotated by 90 degrees.

It can be learned that, after being transmitted through the uplink, the optical signal received by the OLT has the following attributes.

Uplink data is modulated on the second polarization component of the optical signal, and invalid data is modulated on the first polarization component. The first polarization component of the optical signal and the first polarization component of the optical signal previously sent by the OLT to the ONU are perpendicular to each other, and the second polarization component of the optical signal and the second polarization component of the optical signal previously sent by the OLT to the ONU are perpendicular to each other.

For the OLT, a polarization beam combiner (PBC) may include a first polarization port and a second polarization port, where the first polarization port processes only an optical signal of one polarization, and the second polarization port processes only an optical signal of the other polarization. Therefore, when the OLT sends downlink data, the first polarization component of the optical signal sent by the OLT to the ONU may be input from the first polarization port, and the second polarization component may be input from the second polarization port. Then, the PBC may combine the first polarization component and the second polarization component into an optical signal and send the optical signal to the ONU. When the ONU sends uplink data to the OLT, because the first polarization component of the optical signal received by the OLT and the first polarization component of the optical signal previously sent by the OLT to the ONU are perpendicular to each other, and the second polarization component and the second polarization component of the optical signal previously sent by the OLT to the ONU are perpendicular to each other, the first polarization component of the optical signal received by the OLT is output from the second polarization port of the PBC, and the second polarization component is output from the first polarization port of the PBC. Therefore, the OLT may preset the optical signal output from the first polarization port as the optical signal on which the uplink data is modulated, and the OLT may directly demodulate the uplink data from the optical signal output from the first polarization port. For the optical signal output from the second polarization port, because data modulated on the optical signal is invalid, the OLT can perform isolation processing. It should be noted that the isolation processing may be any operation, such as a deletion operation and a discarding operation, which is not limited herein.

In this embodiment, there is no need for an ONU to use complex method to perform polarization correction on a received optical signal or distinguish a specific polarization. Based on this, on one hand, the ONU in this embodiment can directly demodulate downlink data from an optical signal sent by an OLT. On the other hand, for uplink data, the ONU can perform vertical polarization rotation processing on an optical signal and uplink data modulation processing on two polarization components, and send the processed optical signal to the OLT. With the use of a minor symmetry characteristic between the uplink and the downlink on an optical network, two polarization components of an optical signal received by the OLT and two polarization components of an optical signal previously sent by the OLT are perpendicular to each other. Therefore, without the need to perform complex polarization correction, the OLT can conveniently demodulate the uplink data from a correct polarization component.

Figure 2:
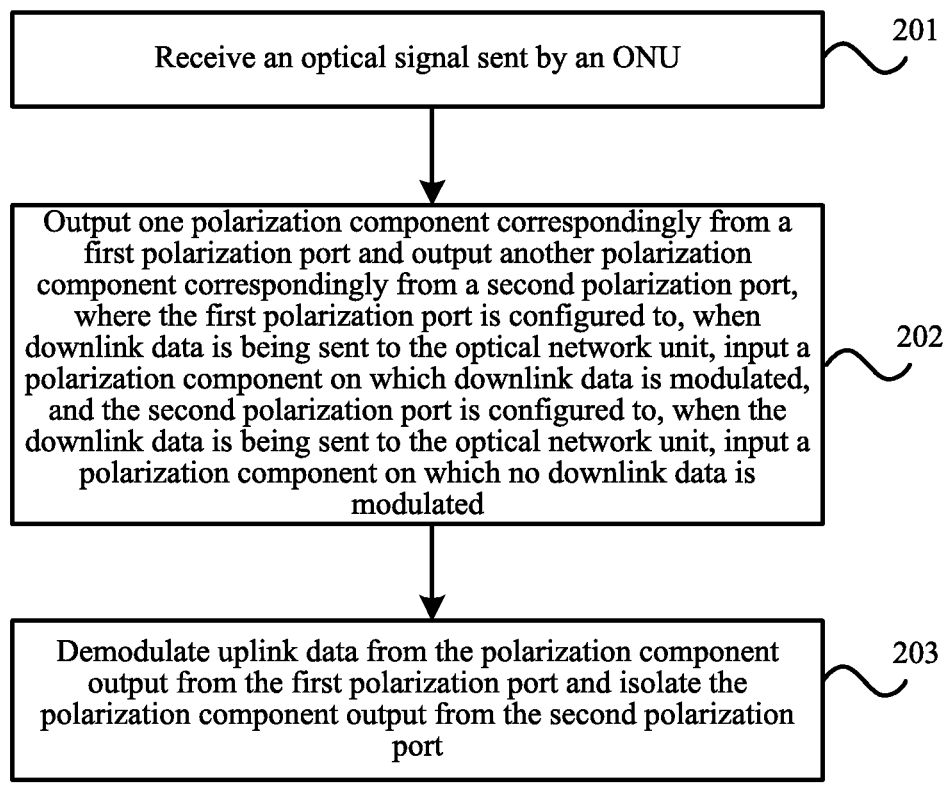
FIG. 2 is a flowchart of a second embodiment of the method for processing an optical network signal according to the present invention.

FIG. 2 is a flowchart of a second embodiment of the method for processing an optical network signal according to the present invention. As shown in FIG. 2, the method in this embodiment may include:

Step 201: Receive an optical signal sent by an ONU.

Step 202: Output one polarization component correspondingly from a first polarization port and output another polarization component correspondingly from a second polarization port, where the first polarization port is configured to, when downlink data is being sent to the optical network unit, input a polarization component on which the downlink data is modulated, and the second polarization port is configured to, when the downlink data is being sent to the optical network unit, input a polarization component on which no downlink data is modulated.

Step 203: Demodulate uplink data from the polarization component output from the first polarization port and isolate the polarization component output from the second polarization port.

An OLT may receive an optical signal sent by the ONU, and more specifically, a PBC in the OLT may receive the optical signal sent by the ONU. The optical signal in this embodiment is an optical signal sent by the ONU to the OLT after the ONU processes the optical signal by using the foregoing first method embodiment. Uplink data is modulated on one polarization component of the optical signal, and uplink data and downlink data are modulated on the other polarization component of the optical signal.

Based on the description in the foregoing first embodiment, it can be learned that the optical signal received by the OLT has the following attribute.

Uplink data is modulated on the second polarization component of the optical signal, and invalid data is modulated on the first polarization component. The first polarization component of the optical signal and a first polarization component of an optical signal previously sent by the OLT to the ONU are perpendicular to each other, and the second polarization component of the optical signal and a second polarization component of the optical signal previously sent by the OLT to the ONU are perpendicular to each other.

For the OLT, the PBC may include a first polarization port and a second polarization port, where the first polarization port processes only an optical signal of one polarization, and the second polarization port processes only an optical signal of the other polarization. Therefore, when the OLT sends downlink data, the first polarization component of the optical signal sent by the OLT to the ONU may be input from the first polarization port, and the second polarization component may be input from the second polarization port. Then, the PBC may combine the first polarization component and the second polarization component into an optical signal and send the optical signal to the ONU. When the ONU sends uplink data to the OLT, because the first polarization component of the optical signal received by the OLT and the first polarization component of the optical signal previously sent by the OLT to the ONU are perpendicular to each other, and the second polarization component and the second polarization component of the optical signal previously sent by the OLT to the ONU are perpendicular to each other, the first polarization component of the optical signal received by the OLT is output from the second polarization port of the PBC, and the second polarization component is output from the first polarization port of the PBC. Therefore, the OLT may preset the optical signal output from the first polarization port as the optical signal on which the uplink data is modulated, and the OLT may directly demodulate the uplink data from the optical signal output from the first polarization port. For the optical signal output from the second polarization port, because data modulated on the optical signal is invalid, the OLT can perform isolation processing. It should be noted that the isolation processing may be any operation, such as a deletion operation and a discarding operation, which is not limited herein.

In this embodiment, after receiving the optical signal sent by the ONU, the OLT may use a characteristic of the PBC in the OLT to demodulate the uplink data from the optical signal output from the first polarization port of the PBC and perform the isolation processing on the optical signal output from the second polarization port of the PBC. Therefore, in this embodiment, without the need to perform complex polarization correction on the received optical signal, the OLT can conveniently demodulate the uplink data, thereby reducing signal processing complexity and hardware costs.

In another embodiment of the present invention, before step 201, the following steps may further be included: generating two polarization components perpendicular to each other according to an optical source signal, modulating downlink data onto one of the two polarization components, and inputting the polarization component on which the downlink data is modulated to the first polarization port, inputting the polarization component on which no downlink data is modulated to the second polarization port, combining the two input polarization components into an optical signal, and sending the optical signal to the optical network unit.

Alternatively, in another embodiment of the present invention, before step 201, the following steps may further be included: modulating downlink data onto an optical source signal, generating two polarization components perpendicular to each other according to the optical source signal on which the downlink data is modulated, where the downlink data is modulated on each polarization component, erasing the downlink data on one of the two polarization components, and inputting the polarization component on which the downlink data is modulated to the first polarization port, inputting the polarization component on which no downlink data is modulated to the second polarization port, combining the two input polarization components into an optical signal, and sending the optical signal to the optical network unit.

Further, before the demodulating uplink data from the polarization component output from the first polarization port, the following may further be included: performing coherent detection on the polarization component output from the first polarization port by using the polarization component on which the downlink data is modulated, and the demodulating uplink data from the polarization component output from the first polarization port includes demodulating the uplink data from a polarization component obtained by the coherent detection.

The OLT has learned the two polarizations of the optical signal sent by the ONU, and therefore it is easy to introduce the coherent detection to the OLT to improve sensitivity of a system receiver.

In the foregoing steps of modulating the downlink data, subcarrier multiplexing SCM, orthogonal frequency division multiplexing OFMD, quadrature phase shift keying QPSK, or M-quadrature amplitude modulation M-QAM may be used to modulate the downlink data onto a subcarrier that is in a polarization component and is corresponding to the ONU.

The foregoing embodiments separately describe the technical solutions of the ONU and the OLT in the present invention.

A specific embodiment is used in the following to describe in detail the technical solution for interactions between the OLT and the ONU to send uplink and downlink data.

Figure 3:
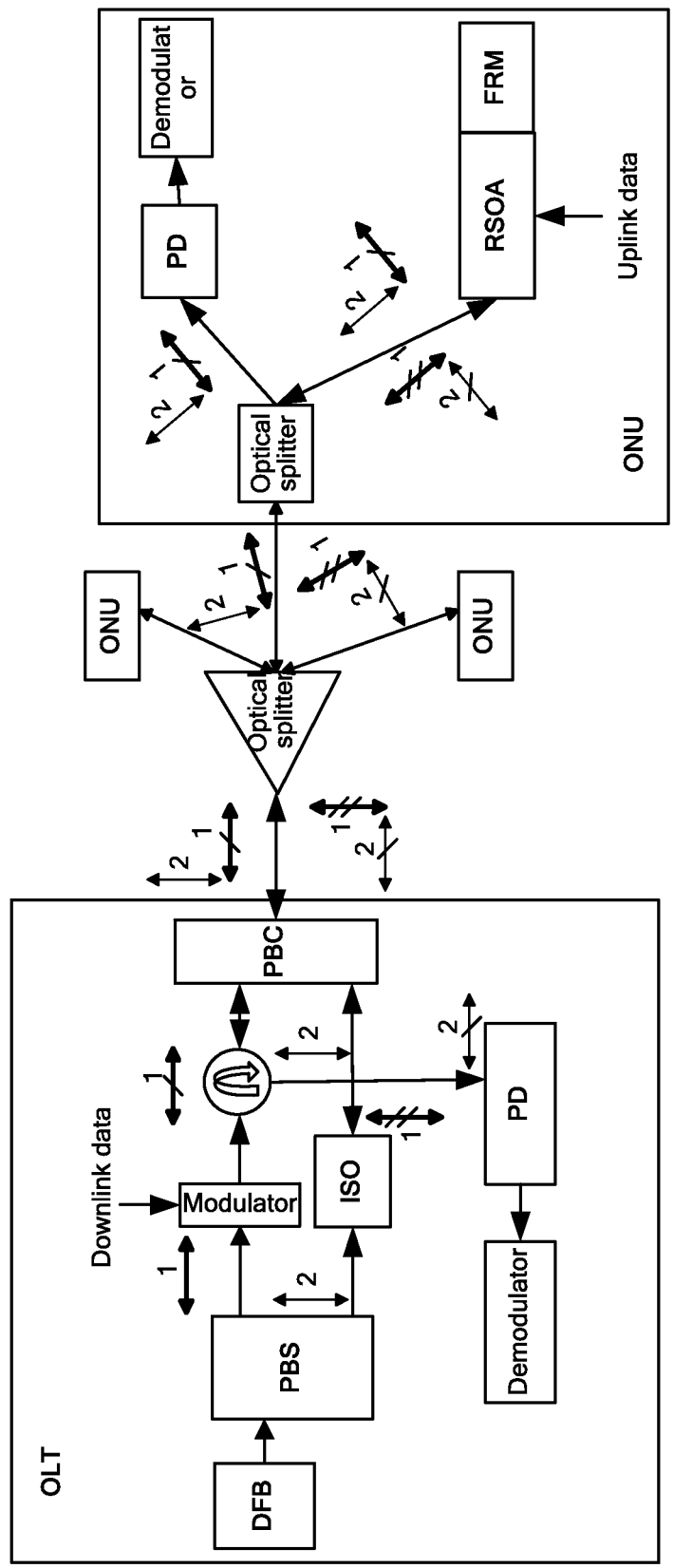
FIG. 3 is a schematic structural diagram of a PON on which a third embodiment of the method for processing an optical network signal according to the present invention is applied.

FIG. 3 is a schematic structural diagram of a PON on which a third embodiment of the method for processing an optical network signal according to the present invention is applied. As shown in FIG. 3, for example, an OLT in this embodiment may include: a distributed feedback laser (DFB) laser, a PBS, a modulator (Mod), an isolator (ISO), a circulator, a PBC, a photonic detector (PD), and a demodulator. Connection relationships between each device are shown in FIG. 3: The OLT is connected to at least two ONUs by using an optical splitter (Splitter). Three ONUs are shown in FIG. 3, and it is understandable that there may be one or two ONUs or more ONUs. For example, an ONU may include: an optical splitter, a PD, a demodulator, a reflective semiconductor optical amplifier (RSOA), and a Faraday rotation minor (FRM). Connection relationships between each device are shown in FIG. 3.

Based on the foregoing schematic structural diagram of the PON, a specific implementation process of the third embodiment of the method for processing an optical network signal according to the present invention is as follows.

On the OLT terminal, the DFB may generate an optical source signal and send the optical source signal to the PBS. The PBS may generate two beams of light whose polarizations are perpendicular to each other, that is, a first polarization component (denoted by a bold double-headed arrow that is marked 1 and output from the PBS in FIG. 3) and a second polarization component (denoted by a thin double-headed arrow that is marked 2 and output from the PBS in FIG. 3). The first polarization component may be referred to as polarization 1 for short, and the second polarization component may be referred to as polarization 2 for short. The Mod modulates downlink data onto polarization 1, where for a format of the downlink data, multiple modulation manners, such as SCM, OFDM, QMSK, and M-QAM, may be used to compress signal bandwidth. Each subcarrier or sub-band may be corresponding to a different ONU so that the subcarrier or the sub-band can be flexibly scheduled between ONUs. Polarization 1 enters into the PBC after passing through the circulator (denoted by an annular arrow in FIG. 3). Polarization 2 enters into the PBC after passing through the ISO. Then, the PBC combines polarization 1 and polarization 2 into an optical signal and sends the optical signal to each ONU by using the Splitter. For one of the ONUs, its optical splitter may receive the optical signal, and the optical signal is separately sent to the PD and the RSOA. Because of a random deflection in a downlink transmission process, both polarization 1 and polarization 2 that are received by the PR and the RSOA have deflected at a certain angle.

After receiving the data, the PD performs optical-to-electronic conversion and then sends an electronic signal to the demodulator. The demodulator demodulates the downlink data from a subcarrier or a sub-band that is in the electronic signal and is corresponding to the ONU, and the RSOA may modulate uplink data onto the two polarizations of the optical signal. The uplink data may also be modulated by using high-order modulation technologies, such as the SCM, the OFDM, the QMSK, and the M-QAM. The uplink data is modulated onto polarization 1 and polarization 2. In this case, both the downlink data and the uplink data are modulated once on polarization 1, and therefore data modulated on polarization 1 becomes invalid. Then, the FRM may perform vertical rotation processing on the optical signal on which uplink data modulation is completed.

Figure 4:
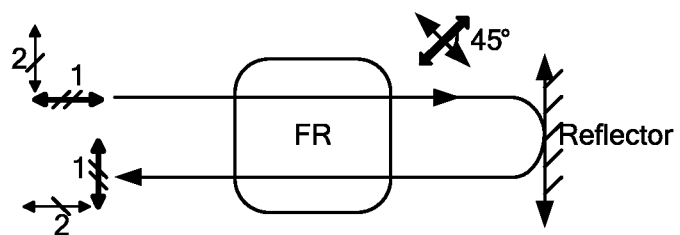
FIG. 4 is a schematic structural diagram of a principle of an FRM in the schematic structural diagram of the PON shown in FIG. 3.

FIG. 4 is a schematic structural diagram of a principle of the FRM in the schematic structural diagram of the PON shown in FIG. 3. As shown in FIG. 4, when an optical signal passes through a Faraday rotation (FR) for the first time, each polarization is rotated by 45 degrees and is returned by a reflector. Then, the optical signal passes through the FR again, and the FR continues to rotate the two polarizations of the optical signal by 45 degrees in a same direction. After passing through the FRM, each polarization is rotated by 90 degrees.

Figure 5:
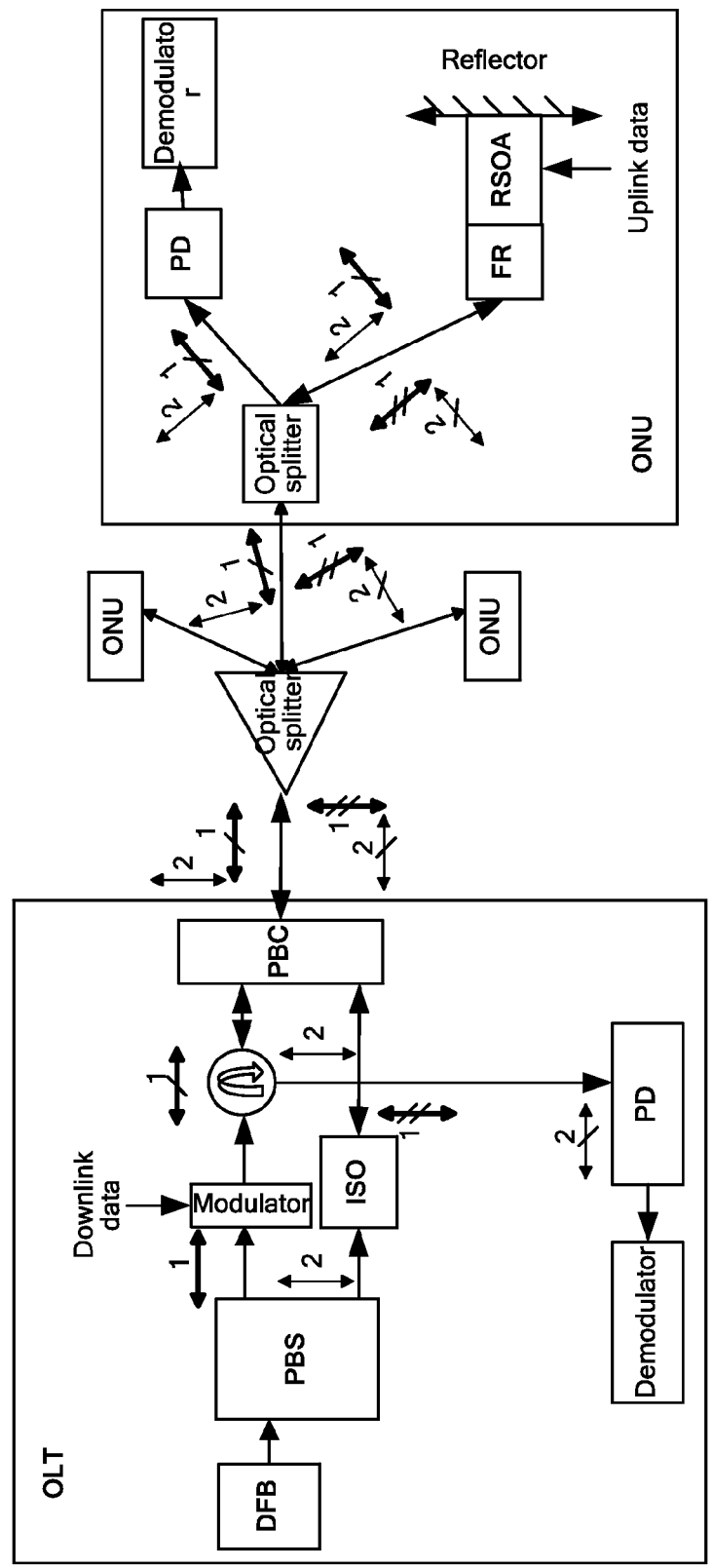
FIG. 5 is a schematic structural diagram of another PON on which the third embodiment of the method for processing an optical network signal according to the present invention is applied.

FIG. 5 is a schematic structural diagram of another PON on which the third embodiment of the method for processing an optical network signal according to the present invention is applied. As shown in FIG. 5, the PON structure is similar to the PON structure shown in FIG. 3. The difference is that, in FIG. 5, an optical splitter may first send a received optical signal to an FR, and then perform uplink data modulation. The implementation principle is similar to that of FIG. 3, and details are not described herein again.

After uplink data modulation and vertical rotation processing, an optical signal may be sent to the optical splitter, where uplink data is modulated on polarization 2 of the optical signal, and uplink data and downlink data are modulated on polarization 1. Then, the optical splitter may send the optical signal to a PBC in an OLT, and the PBC may divide the optical signal into polarization 1 and polarization 2, where polarization 2 on which uplink data is modulated may be output from a port corresponding to a direction of polarization 2, and the optical signal of the input polarization 2 may be input to a circulator. An optical annular direction of the circulator may send the optical signal of polarization 2 to a PD, so that the PD can convert the optical signal of polarization 2 into an electronic signal and demodulate the uplink data from the electronic signal. Polarization 1 on which the uplink data and the downlink data are modulated may be output from a port corresponding to polarization 1 and sent to an ISO, and the ISO may isolate the optical signal of polarization 1.

Figure 6:
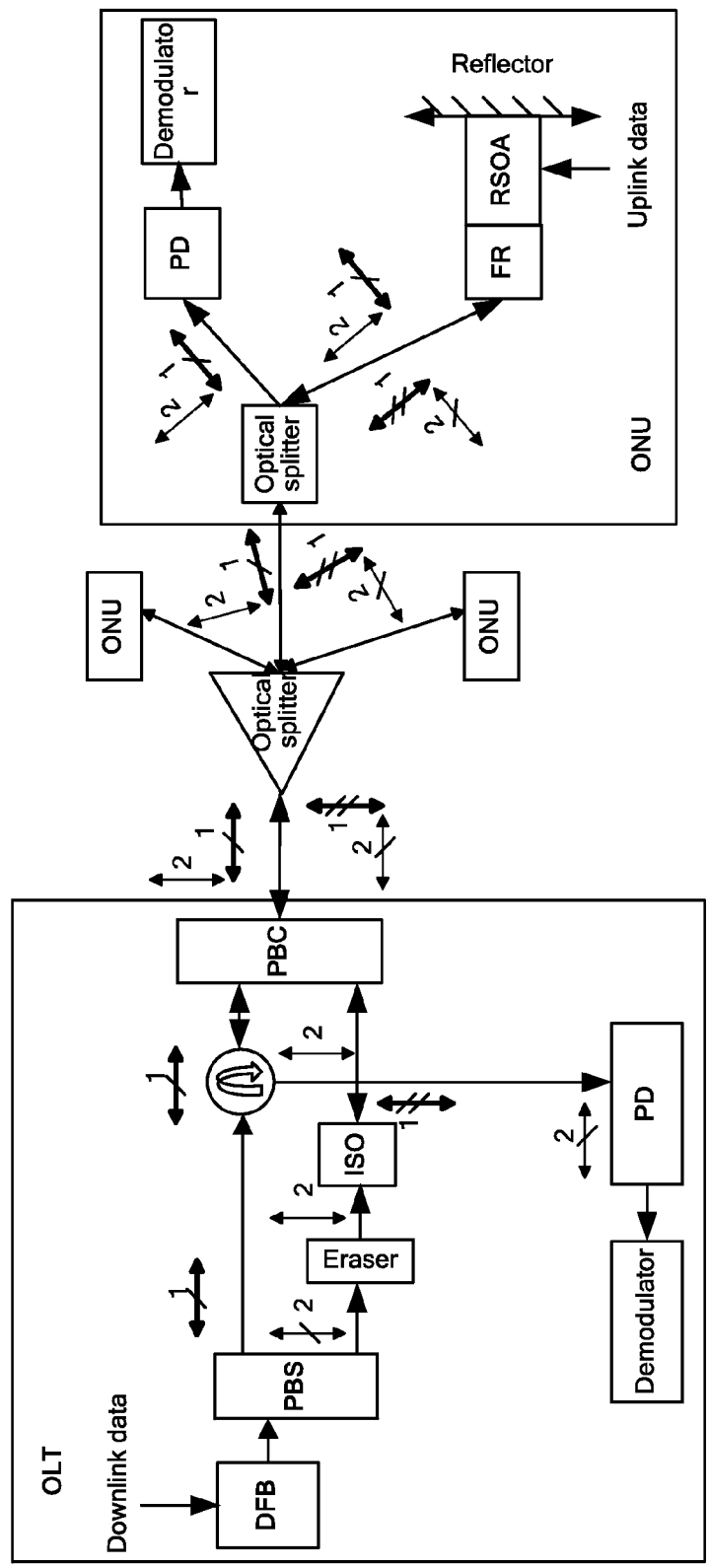
FIG. 6 is a schematic structural diagram of yet another PON on which the third embodiment of the method for processing an optical network signal according to the present invention is applied.

FIG. 6 is a schematic structural diagram of yet another PON on which the third embodiment of the method for processing an optical network signal according to the present invention is applied. As shown in FIG. 6, in this PON structure, an ONU may use an ONU structure similar to that shown in FIG. 3 or FIG. 5. In this embodiment, only the ONU shown in FIG. 5 is used as an example for description. For an OLT, a DFB may first modulate downlink data onto an optical source signal. Then, the PBS may generate two polarization components perpendicular to each other according to the optical source signal on which the downlink data is modulated, and the downlink data is modulated on each polarization component. An eraser may erase the downlink data modulated on one of two the polarization components, so that the downlink data is modulated on only one of the two polarization components input to a PBC. Processing of a circulator is similar to the processing of the circulator shown in FIG. 5, and details are not described herein again.

Figure 7:
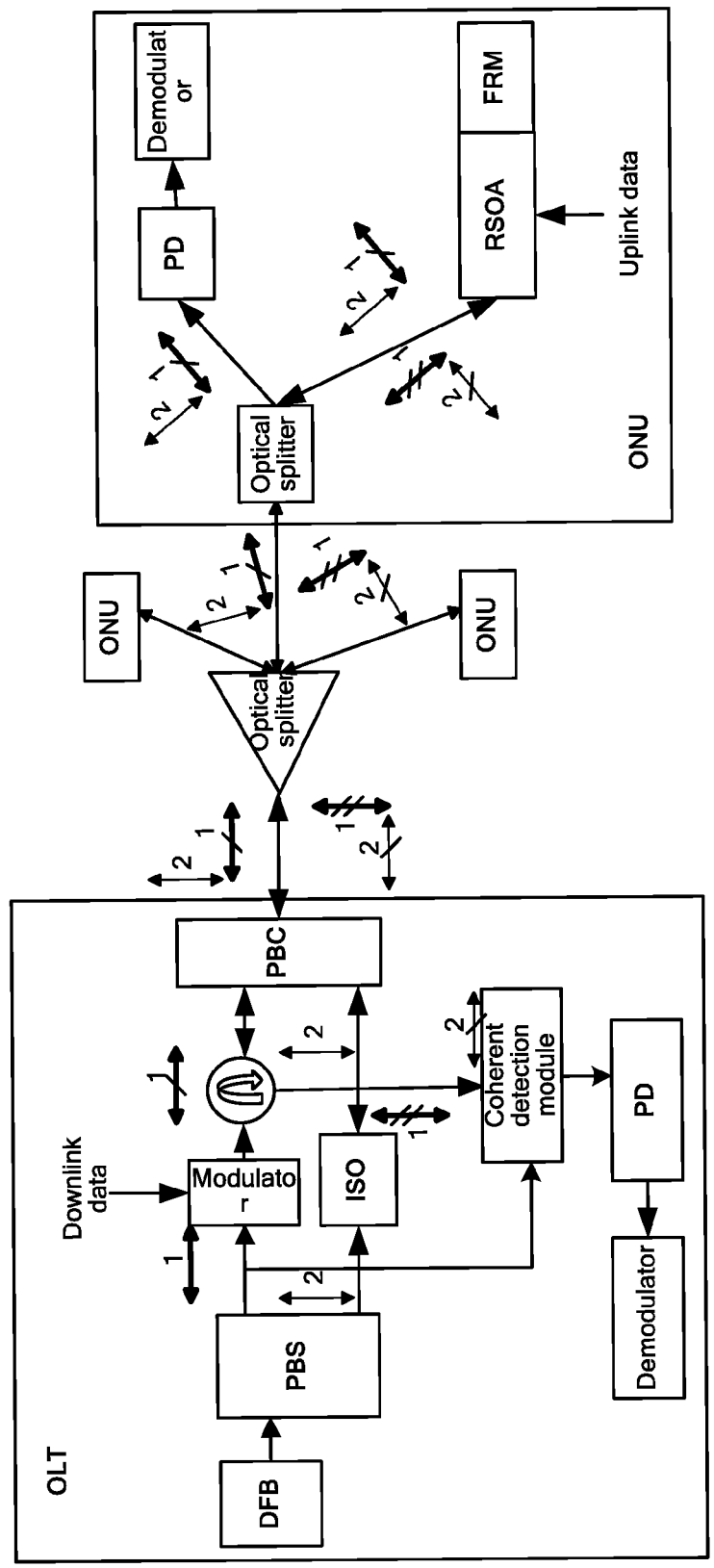
FIG. 7 is a schematic structural diagram of still another PON on which the third embodiment of the method for processing an optical network signal according to the present invention is applied.

FIG. 7 is a schematic structural diagram of still another PON on which the third embodiment of the method for processing an optical network signal according to the present invention is applied. As shown in FIG. 7, the PON structure is similar to the PON structure shown in FIG. 3. The difference is that a coherent detection module is introduced in FIG. 7. Before a PD demodulates a polarization component on which uplink data is modulated, the coherent detection module performs, by using a polarization component that is in a same direction and generated by an optical source signal, coherent detection on the polarization component on which the uplink data is modulated. It is understandable that a coherent detection module may also be added to the PON structure shown in FIG. 5 or FIG. 6. The implementation principles are similar, and details are not described herein again.

It should be noted that in this embodiment, a circulator is used to send an optical signal of polarization 2 to the PD without the need of changing a PBC. The implementation cost is relatively low. It is understandable that the circulator may not be used in this embodiment only if the PBC is improved so that an uplink optical signal and a downlink optical signal can be identified.

In this embodiment, because the uplink data and the downlink data are modulated onto two different polarizations, all available bandwidth of an RSOA can be used. Polarization 2 on which the uplink data is modulated is output from a corresponding port in the PBC, passes through the circulator, and enters into the PD. Polarization 1 on which invalid data is modulated can be naturally output from a corresponding port in the PBC and is isolated and terminated by an ISO. As for the PBC, a perpendicular relationship between an uplink polarization and a downlink polarization can be used skillfully in this embodiment to easily separate the two polarizations, without any complex and extra polarization correction processing.

In addition, in this embodiment, an optical source of the ONU is the RSOA, where a wavelength of an uplink optical signal is equal to a wavelength of an optical signal injected in the downlink, and an optical signal of the RSOA that is injected by each ONU comes from a DFB laser of a same OLT terminal. Therefore, wavelengths of uplink optical signals are the same. In this case, multiple ONUs can send data simultaneously, thereby avoiding a problem that optical beating interference (OBI) occurs on the OLT terminal because different ONUs may send uplink optical signals with different wavelengths. Therefore, compared with uplink bandwidth in a situation that the OBI exists, the uplink bandwidth increases N times, where N is equal to the number of ONUs connected to the OLT.

It should be noted that the foregoing FIG. 3 to FIG. 7 only show some possible implementation means. Based on the technical solutions in the embodiments of the present invention, persons skilled in the art can implement a circuit according to their own practical needs, as long as relevant functions can be completed.

Figure 8:
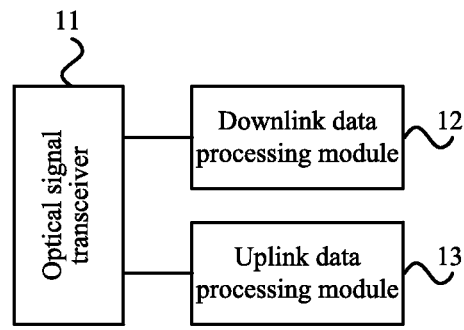
FIG. 8 is a schematic structural diagram of a first embodiment of an optical network unit according to the present invention.

FIG. 8 is a schematic structural diagram of a first embodiment of an optical network unit according to the present invention. As shown in FIG. 8, the ONU in this embodiment may include: an optical signal transceiver 11, a downlink data processing module 12, and an uplink data processing module 13.

The optical signal transceiver 11 is configured to receive an optical signal sent by an OLT, where the optical signal includes two polarization components perpendicular to each other, and downlink data is modulated on one of the two polarization components; divide the optical signal into two signals, where each signal is the optical signal; and send one optical signal to the downlink data processing module 12, send the other optical signal to the uplink data processing module 13, and send an optical signal sent by the uplink data processing module 13 to the OLT.

The downlink data processing module 12 is configured to demodulate the downlink data from the received optical signal.

The uplink data processing module 13 is configured to perform, the received optical signal, vertical polarization rotation processing and processing of modulating uplink data onto two polarization components of the received optical signal, and send the optical signal on which the vertical polarization rotation processing and the uplink data modulation processing are performed to the optical signal transceiver 11, so that the optical signal transceiver 11 can send the optical signal to the OLT.

The ONU in this embodiment may be used to perform the technical solutions in the method embodiment shown in FIG. 1. Implementation principles and technical effects of the OLT are similar to the technical solutions in the method embodiment. Therefore, details are not described herein again.

Figure 9:
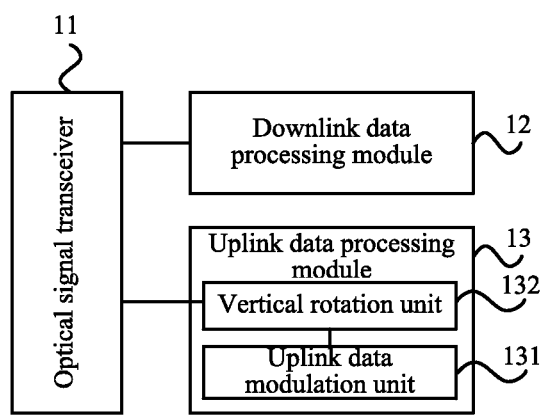
FIG. 9 is a schematic structural diagram of a second embodiment of the optical network unit according to the present invention.

FIG. 9 is a schematic structural diagram of a second embodiment of the optical network unit according to the present invention. As shown in FIG. 9, the ONU in this embodiment is based on the ONU structure shown in FIG. 8. Further, the uplink data processing module 13 may include: an uplink data modulation unit 131 and a vertical rotation unit 132, where the vertical rotation unit 132 is configured to rotate the two polarization components of received optical signal by 45 degrees, perform reflection processing on the two polarization components on which uplink data is modulated, and continue to rotate by 45 degrees the two polarization components on which the reflection processing is performed; and the uplink data modulation unit 131 is configured to modulate the uplink data onto the two polarization components before the reflection processing. In this implementation manner, the uplink data modulation unit 131 may be the RSOA in the ONU shown in FIG. 5, and the vertical rotation unit 132 may be the FR and the reflector placed behind the RSOA that are in the ONU shown in FIG. 5. The optical signal transceiver 11 may be the optical splitter in FIG. 5.

Figure 10:
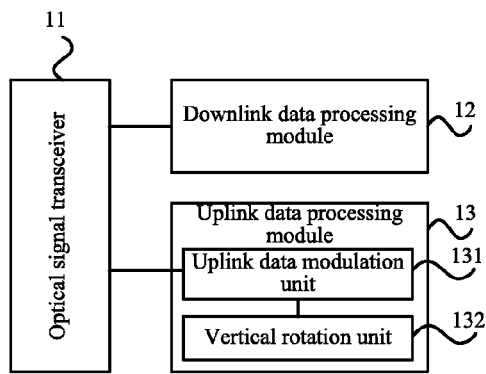
FIG. 10 is a schematic structural diagram of a third embodiment of the optical network unit according to the present invention.

FIG. 10 is a schematic structural diagram of a third embodiment of the optical network unit according to the present invention. As shown in FIG. 10, the ONU in this embodiment is based on the ONU structure shown in FIG. 8. Further, the uplink data processing module 13 may include: an uplink data modulation unit 131 and a vertical rotation unit 132. The uplink data modulation unit 131 is configured to modulate uplink data onto the two polarization components of the received optical signal. The vertical rotation unit 132 is configured to rotate by 45 degrees the two polarization components after the uplink data is modulated, perform reflection processing on the two polarization components which have been rotated by 45 degrees, and continue to rotate by 45 degrees the two polarization components on which the reflection processing is performed. In this implementation manner, the uplink data modulation unit 131 may be the RSOA in the ONU shown in FIG. 3, and the vertical rotation unit 132 may be the FRM in the ONU shown in FIG. 3. The optical signal transceiver 11 may be the optical splitter in FIG. 5.

Both the vertical rotation units 132 in the embodiments shown in the foregoing FIG. 9 and FIG. 10 can be implemented by using the structure shown in FIG. 4.

In any one of the ONU structures shown in FIG. 8 to FIG. 10, the downlink data processing module 12 may include a photonic detector and a demodulation unit, where the photonic detector is configured to convert the optical signal received by the optical signal transceiver 11 into an electronic signal, and send the electronic signal to the demodulation unit, and the demodulation unit is configured to demodulate the downlink data from the electronic signal. In this implementation manner, the photonic detector may be the PD in the ONU shown in FIG. 3 to FIG. 7, and the demodulation unit may be the demodulator in the ONU shown in FIG. 3 to FIG. 7.

The ONU in the foregoing embodiment may be specifically used to perform the technical solutions in the method embodiments corresponding to the ONU. Implementation principles and technical effects of the ONU are similar to the technical solutions. Therefore, details are not described herein again.

Figure 11:
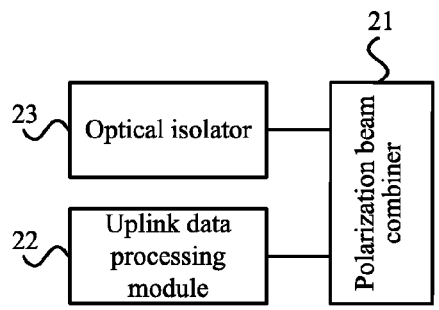
FIG. 11 is a schematic structural diagram of a first embodiment of an optical line terminal according to the present invention.

FIG. 11 is a schematic structural diagram of a first embodiment of an optical line terminal according to the present invention. As shown in FIG. 11, an OLT in this embodiment may include: a polarization beam combiner 21, an uplink data processing module 22, and an optical isolator 23, where the polarization beam combiner 21 is configured to receive an optical signal sent by an ONU, output one polarization component correspondently from a first polarization port, and output the other polarization component correspondently from a second polarization port, where the first polarization port is configured to, when downlink data is being sent to the optical network unit, input a polarization component on which the downlink data is modulated, and the second polarization port is configured to, when the downlink data is being sent to the ONU, input a polarization component on which no downlink data is modulated; the uplink data processing module 22 is configured to demodulate uplink data from the polarization component output from the first polarization port; and the optical isolator 23 is configured to isolate the polarization component output from the second polarization port.

The OLT in this embodiment may be used to perform the technical solutions in the method embodiment shown in FIG. 2. Implementation principles and technical effects of the OLT are similar to the technical solutions in the method embodiment. Therefore, details are not described again.

Figure 12:
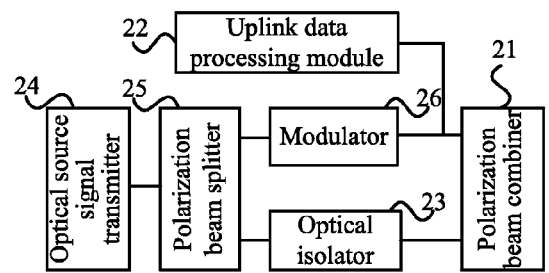
FIG. 12 is a schematic structural diagram of a second embodiment of the optical line terminal according to the present invention.

FIG. 12 is a schematic structural diagram of a second embodiment of the optical line terminal according to the present invention. As shown in FIG. 12, based on the OLT shown in FIG. 11, an OLT in this embodiment further includes: an optical source signal transmitter 24, a polarization beam splitter 25, and a modulator 26.

The optical source signal transmitter 24 is configured to generate an optical source signal and send the optical source signal to the polarization beam splitter 25, the polarization beam splitter 25 is configured to generate two polarization components perpendicular to each other according to the optical source signal, send one polarization component to the modulator 26, and input the other polarization component to the second polarization port of the polarization beam combiner 21 by using the optical isolator 23, the modulator 26 is configured to modulate downlink data onto the first polarization component and input the first polarization component on which the downlink data is modulated to the first polarization port of the polarization beam combiner 21, and the polarization beam combiner 21 is further configured to combine the second polarization component input from the second polarization port and the first polarization component, input from the first polarization port, on which the downlink data is modulated into an optical signal and send the optical signal to the ONU.

Figure 13:
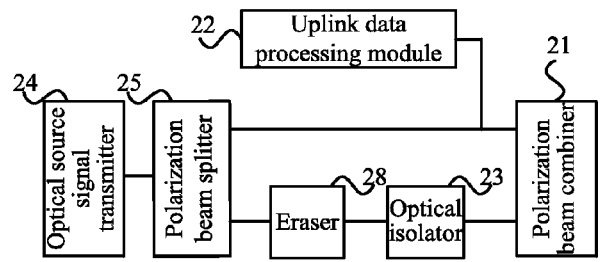
FIG. 13 is a schematic structural diagram of a third embodiment of the optical line terminal according to the present invention.

FIG. 13 is a schematic structural diagram of a third embodiment of the optical line terminal according to the present invention. As shown in FIG. 13, based on the OLT shown in FIG. 11, an OLT in this embodiment further includes: an optical source signal transmitter 24, a polarization beam splitter 25, and an eraser 28, where the optical source signal transmitter 24 is configured to generate an optical source signal, modulate downlink data onto the optical source signal, and send the optical source signal on which the downlink data is modulated to the polarization beam splitter 25, the polarization beam splitter 25 is configured to generate two polarization components perpendicular to each other according to the optical source signal on which the downlink data is modulated, where the downlink data is modulated on each polarization component, send one polarization component to the eraser 28, and input the other polarization component to the first polarization port of the polarization beam combiner 21, the eraser 28 is configured to erase the downlink data on the polarization component and input, by using the optical isolator 23, the polarization component after the erasing to the second polarization port of the polarization beam combiner 21, and the polarization beam combiner 21 is further configured to combine the polarization component input from the first polarization port and the polarization component input from the second polarization port into an optical signal and send the optical signal to the optical network unit.

Figure 14:
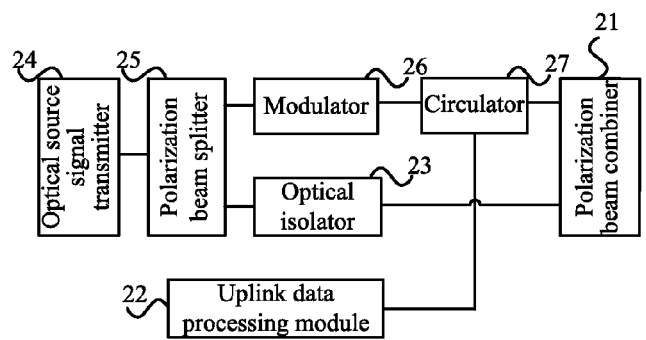
FIG. 14 is a schematic structural diagram of a fourth embodiment of the optical line terminal according to the present invention.

FIG. 14 is a schematic structural diagram of a fourth embodiment of the optical line terminal according to the present invention. As shown in FIG. 14, based on the OLT shown in FIG. 11, an OLT in this embodiment may further include a circulator 27, where the circulator 27 is connected to the modulator 26, the first polarization port of the polarization beam combiner 21, and the uplink data processing module 22; and is configured to send the polarization component, received from the modulator 26, on which the downlink data is modulated to the first polarization port of the polarization beam combiner 21, and send the polarization component output from the first polarization port of the polarization beam combiner 21 to the uplink data processing module 22.

Further, the OLT may further include a coherent detection module; and the uplink data processing module 22 may include a photonic detector and a demodulation unit, where the coherent detection module is configured to perform coherent detection on the polarization component output from the first polarization port by using a polarization component that is generated by the optical source signal and used for downlink data modulation; the photonic detector is configured to convert the polarization component on which the coherent detection is completed into an electronic signal and send the electronic signal to the demodulation unit; and the demodulation unit is configured to demodulate the uplink data from the electronic signal.

In specific implementation, the polarization beam combiner 21 may be the PBC in the OLT shown in FIG. 3 to FIG. 7; the photonic detector may be the PD in the OLT; the demodulation unit may be the demodulator in the OLT; the optical isolator 23 may be the ISO in the OLT; the optical source signal transmitter 24 may be the DFB in the OLT; the polarization beam splitter 25 may be the PBS in the OLT; the modulator 26 may be the modulator in the OLT; and the circulator 27 may be the circulator in the OLT.

The OLT in the foregoing embodiment may be specifically used to perform technical solutions in the method embodiments shown in FIG. 3 to FIG. 7. Implementation principles and technical effects of the OLT are similar to the technical solutions in the method embodiments. Therefore, details are not described herein again.

Figure 15:
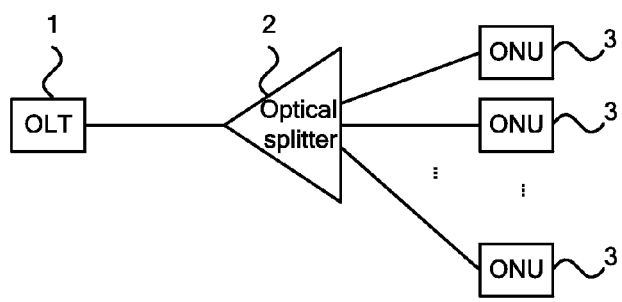
FIG. 15 is a schematic structural diagram of a first embodiment of an optical network communications system according to the present invention.

FIG. 15 is a schematic structural diagram of a first embodiment of an optical network communications system according to the present invention. As shown in FIG. 15, the system in this embodiment may include: an OLT 1, an optical splitter 2, and multiple ONUs 3, where the OLT 1 is connected to the optical splitter 2, and the optical splitter 2 is connected to the multiple ONUs; and the OLT in any embodiment in the foregoing OLT embodiments may be used as the OLT 1, and the ONU in any embodiment in the foregoing ONU embodiments may be used as the ONU 3. It is understandable that the ONU in FIG. 15 may be only one.

The optical network system in the foregoing embodiment may be specifically used to perform the technical solutions in the method embodiments shown in FIG. 3 to FIG. 6. Implementation principles and technical effects of the optical network system are similar to the technical solutions in the method embodiments. Therefore, details are not described herein again.

A PON network structure is mainly used as an example for description in the foregoing embodiment of the present invention. It is understandable that the OLT and the ONU in the foregoing embodiment may also be applied in an optical network communications system such as a wavelength division multiplexing passive optical network (WDM-PON).

Figure 16:
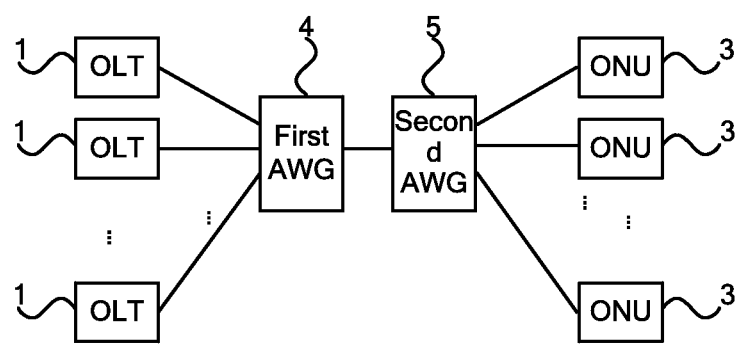
FIG. 16 is a schematic structural diagram of a second embodiment of the optical network communications system according to the present invention.

FIG. 16 is a schematic structural diagram of a second embodiment of the optical network communications system according to the present invention. As shown in FIG. 16, the system in this embodiment may include: multiple OLTs 1, a first arrayed waveguide grating (AWG) 4, a second AWG 5, and multiple ONUs 3, where the multiple OLTs 1 are connected to the first AWG 4; the first AWG 4 is connected to the second AWG 5; and the second AWG 5 is connected to the multiple ONUs 3.

The OLT in any embodiment in the foregoing OLT embodiments may be used as the OLT 1, and the ONU in any embodiment in the foregoing ONU embodiments may be used as the ONU 3.

It is understandable that the first AWG 4 and the second AWG 5 in the foregoing embodiment may be combined into one AWG for implementation.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for processing an optical network signal, comprising:
    receiving an optical signal sent by an optical line terminal, wherein the optical signal comprises two polarization components perpendicular to each other, and downlink data is modulated on one of the polarization components;
    dividing the optical signal into one optical signal and another optical signal, wherein each of the one optical signal and the other optical signal is the same as the received optical signal;
    demodulating the downlink data from one optical signal, and performing, for the other optical signal, vertical polarization rotation processing and processing of modulating uplink data onto two polarization components of the optical signal; and
    sending the other optical signal on which the vertical polarization rotation processing and the modulating uplink data processing are performed to the optical line terminal, so that the optical line terminal demodulates the uplink data from the received optical signal.

2. The method according to claim 1, wherein the performing, for the other optical signal, vertical polarization rotation processing and processing of modulating uplink data onto two polarization components of the optical signal comprises:
    rotating the two polarization components by 45 degrees, modulating the uplink data onto the two polarization components which have been rotated by 45 degrees, performing reflection processing on the two polarization components after the uplink data is modulated, and continuing to rotate by 45 degrees the two polarization components on which the reflection processing is performed;
    or,
    modulating the uplink data onto the two polarization components, rotating by 45 degrees the two polarization components after the uplink data is modulated, performing reflection processing on the two polarization components which have been rotated by 45 degrees, and continuing to rotate by 45 degrees the two polarization components on which the reflection processing is performed.

3. The method according to claim 1, wherein the modulating uplink data processing comprises:
    modulating the uplink data onto a corresponding subcarrier in the optical signal by using subcarrier multiplexing, orthogonal frequency division multiplexing, quadrature phase shift keying, or M-quadrature amplitude modulation.

4. A method for processing an optical network signal, comprising:
    receiving an optical signal sent by an optical network unit;
    outputting one polarization component correspondingly from a first polarization port and outputting another polarization component correspondingly from a second polarization port, wherein the first polarization port is configured to, when downlink data is being sent to the optical network unit, input a polarization component on which the downlink data is modulated, and the second polarization port is configured to, when the downlink data is being sent to the optical network unit, input a polarization component on which no downlink data is modulated; and
    demodulating uplink data from the polarization component output from the first polarization port and isolating the polarization component output from the second polarization port.

5. The method according to claim 4, before the receiving the optical signal sent by the optical network unit, further comprising:
    generating two polarization components perpendicular to each other according to an optical source signal;
    modulating downlink data onto one of the two polarization components; and
    inputting the polarization component on which the downlink data is modulated to the first polarization port, inputting the polarization component on which no downlink data is modulated to the second polarization port, combining the two input polarization components into a second optical signal, and sending the second optical signal to the optical network unit.

6. The method according to claim 4, before the receiving the optical signal sent by the optical network unit, further comprising:
    modulating downlink data onto an optical source signal;
    generating two polarization components perpendicular to each other according to the optical source signal on which the downlink data is modulated, wherein the downlink data is modulated on each polarization component;
    erasing the downlink data on one of the two polarization components; and
    inputting the polarization component on which the downlink data is modulated to the first polarization port, inputting the polarization component on which no downlink data is modulated to the second polarization port, combining the two input polarization components into a second optical signal, and sending the second optical signal to the optical network unit.

7. The method according to claim 5, wherein before the demodulating uplink data from the polarization component output from the first polarization port, the method further comprises:
    performing coherent detection on the polarization component output from the first polarization port by using the polarization component on which the downlink data is modulated; and
    the demodulating uplink data from the polarization component output from the first polarization port comprises:
    demodulating the uplink data from a polarization component obtained by the coherent detection.

8. An optical network unit, comprising: an optical signal transceiver, a downlink data processing module, and an uplink data processing module, wherein:
    the optical signal transceiver is configured to receive an optical signal sent by an optical line terminal, wherein the optical signal comprises two polarization components perpendicular to each other, and downlink data is modulated on one of the polarization components; divide the optical signal into one optical signal and another optical signal, wherein each of the one optical signal and the other signal is the same as the received optical signal; send the one optical signal to the downlink data processing module; send the other optical signal to the uplink data processing module; and send the optical signal sent by the uplink data processing module to the optical line terminal;

the downlink data processing module is configured to demodulate the downlink data from the received optical signal; and the uplink data processing module is configured to perform, for the received optical signal, vertical polarization rotation processing and processing of modulating uplink data onto two polarization components of the received optical signal, and send the optical signal on which the vertical polarization rotation processing and the uplink data modulation processing are performed to the optical signal transceiver, so that the optical signal transceiver sends the optical signal to the optical line terminal.

9. The optical network unit according to claim 8, wherein the uplink data processing module comprises: an uplink data modulation unit and a vertical rotation unit, wherein:

the vertical rotation unit is configured to rotate the two polarization components of received optical signal by 45 degrees, perform reflection processing on the two polarization components after the uplink data is modulated, and continue to rotate by 45 degrees the two polarization components on which the reflection processing is performed; and the uplink data modulation unit is configured to modulate the uplink data onto the two polarization components before the reflection processing;

or, the uplink data modulation unit is configured to modulate the uplink data onto the two polarization components of the received optical signal; and the vertical rotation unit is configured to rotate by 45 degrees the two polarization components after the uplink data is modulated, perform reflection processing on the two polarization components which have been rotated by 45 degrees, and continue to rotate by 45 degrees the two polarization components on which the reflection processing is performed.

10. The optical network unit according to claim 9, wherein the vertical rotation unit is a Faraday rotation mirror (FRM), and the uplink data modulation unit is a reflective semiconductor optical amplifier (RSOA).

11. The optical network unit according to claim 8, wherein the downlink data processing module comprises: a photonic detector and a demodulation unit, wherein:

the photonic detector is configured to convert the optical signal received by the optical signal transceiver into an electronic signal and send the electronic signal to the demodulation unit; and the demodulation unit is configured to demodulate the downlink data from the electronic signal.

12. An optical line terminal, comprising: a polarization beam combiner, an uplink data processing module, and an optical isolator, wherein:

the polarization beam combiner is configured to receive an optical signal sent by an optical network unit, output one polarization component correspondingly from a first polarization port, and output another polarization component correspondingly from a second polarization port, wherein the first polarization port is configured to, when downlink data is being sent to the optical network unit, input a polarization components on which the downlink data is modulated, and the second polarization port is configured to, when the downlink data is being sent to the optical network unit, input a polarization component on which no downlink data is modulated;

the uplink data processing module is configured to demodulate an uplink data from the polarization component output from the first polarization port; and the optical isolator is configured to isolate the polarization component output from the second polarization port.

13. The optical line terminal according to claim 12, further comprising: an optical source signal transmitter, a polarization beam splitter, and a modulator, wherein:

the optical source signal transmitter is configured to generate an optical source signal and send the optical source signal to the polarization beam splitter;

the polarization beam splitter is configured to generate two polarization components perpendicular to each other according to the optical source signal, send one polarization component to the modulator, and input the other polarization component to the second polarization port of the polarization beam combiner by using the optical isolator;

the modulator is configured to modulate downlink data onto the polarization component and input the polarization component on which the downlink data is modulated to the first polarization port of the polarization beam combiner; and the polarization beam combiner is further configured to combine the polarization component input from the first polarization port and the polarization component input from the second polarization port into a second optical signal and send the second optical signal to the optical network unit.

14. The optical line terminal according to claim 12, further comprising: an optical source signal transmitter, a polarization beam splitter, and an eraser, wherein:

the optical source signal transmitter is configured to generate an optical source signal, modulate downlink data onto the optical source signal, and send the optical source signal on which the downlink data is modulated to the polarization beam splitter;

the polarization beam splitter is configured to generate two polarization components perpendicular to each other according to the optical source signal on which the downlink data is modulated, wherein the downlink data is modulated on each polarization component, send one polarization component to the eraser, and input the other polarization component to the first polarization port of the polarization beam combiner;

the eraser is configured to erase the downlink data on the polarization component and input, by using the optical isolator, the polarization component after the downlink data is erased to the second polarization port of the polarization beam combiner; and the polarization beam combiner is further configured to combine the polarization component input from the first polarization port and the polarization component input from the second polarization port into a second optical signal and send the second optical signal to the optical network unit.

15. The optical line terminal according to claim 13, further comprising:

a circulator, wherein the circulator is connected to the modulator, the first polarization port of the polarization beam combiner, and the uplink data processing module; and the circulator is configured to send, to the first polarization port of the polarization beam combiner, the polarization component which is received from the modulator and on which the downlink data is modulated, and send the polarization component output from the first polarization port of the polarization beam combiner to the uplink data processing module.

16. The optical line terminal according to claim 12, further comprising: a coherent detection module, wherein the uplink data processing module comprises a photonic detector and a demodulation unit;

the coherent detection module is configured to perform coherent detection on the polarization component output from the first polarization port by using the polarization component on which the downlink data is modulated; and the photonic detector is configured to convert the polarization component on which the coherent detection is completed into an electronic signal, and send the electronic signal to the demodulation unit; and the demodulation unit is configured to demodulate the uplink data from the electronic signal.

17. An optical network communications system, comprising: an optical line terminal and an optical network unit, wherein the optical line terminal is connected to the optical network unit by using an optical splitter or by using arrayed waveguide grating; and the optical line terminal according to claim 12 is used as the optical line terminal.

18. An optical network communications system, comprising: an optical line terminal and an optical network unit, wherein the optical line terminal is connected to the optical network unit by using an optical splitter or by using arrayed waveguide grating; and the optical network unit according to claim 8 is used as the optical network unit.

* * * * *